United States Patent [19]

Kendall et al.

[11] 4,047,186
[45] Sept. 6, 1977

[54] PRE-AIMED NOZZLE FOR INK JET RECORDER AND METHOD OF MANUFACTURE

[75] Inventors: Arthur Harry Kendall, Franklin Lakes, N.J.; Robert Lewis Rohr, Scarsdale, N.Y.

[73] Assignee: International Business Machines Corporation, Armonk, N.Y.

[21] Appl. No.: 652,280

[22] Filed: Jan. 26, 1976

[51] Int. Cl.² .................. G01D 15/18; B23P 15/00
[52] U.S. Cl. .............. 346/140 R; 29/157 C; 29/411; 29/417; 239/596
[58] Field of Search ............ 29/157 C, 411, 417; 239/15, 596, 102; 346/75, 140, 140 R, 140 A

[56] References Cited

U.S. PATENT DOCUMENTS

| | | | |
|---|---|---|---|
| 1,261,282 | 4/1918 | Peabody | 29/157 C |
| 1,869,809 | 8/1932 | Hewlett | 29/157 C |
| 2,120,388 | 6/1938 | Bargeboer | 239/15 |
| 2,323,001 | 6/1943 | Bargeboer | 239/596 |
| 3,281,860 | 10/1966 | Adams et al. | 346/75 |
| 3,404,213 | 10/1968 | Brookover et al. | 29/588 |
| 3,591,915 | 7/1971 | Roberts et al. | 29/157 C |
| 3,733,180 | 5/1973 | Heineck et al. | 238/15 |
| 3,823,408 | 7/1974 | Gordon | 346/140 |

OTHER PUBLICATIONS

Replaceable Ink Jet Nozzle, by T. J. Kotasek, from I.B.M. Technical Disclosure Bulletin, vol. 15, No. 3, Aug., 1972, p. 910.
Fabricating an Ink Jet Nozzle, by R. Lane, from I.B.M. Technical Disclosure Bulletin, vol. 16, No. 10, Mar., 1974, p. 3413.

*Primary Examiner*—C.W. Lanham
*Assistant Examiner*—Daniel C. Crane
*Attorney, Agent, or Firm*—Jack M. Arnold

[57] ABSTRACT

A pre-aimed nozzle device comprises a nozzle block with an orifice wafer attached thereto. The nozzle block has an aiming surface. The orifice wafer comprises an annular orifice element retained in the body of the wafer in a manner whereby the orifice element and wafer are bonded to the nozzle block with the opening of the orifice element perpendicular to the aiming surface. The orifice wafer is made by encapsulating a straight section of glass tubing in a block of ceramic. The block is machined with precision external location surfaces. A groove is machined into the block with internal location surfaces parallel with the external location surfaces. After potting of the tube in the groove with solder glass, the wafer block is cut along planes perpendicular to the external location surfaces to obtain annular orifice elements precisely aimed relative to the wafer body.

14 Claims, 11 Drawing Figures

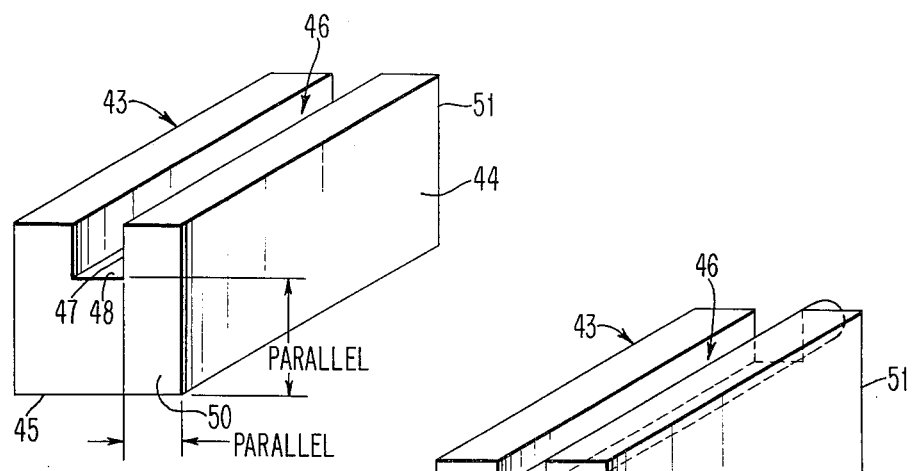
FIG. 3
FIG. 4
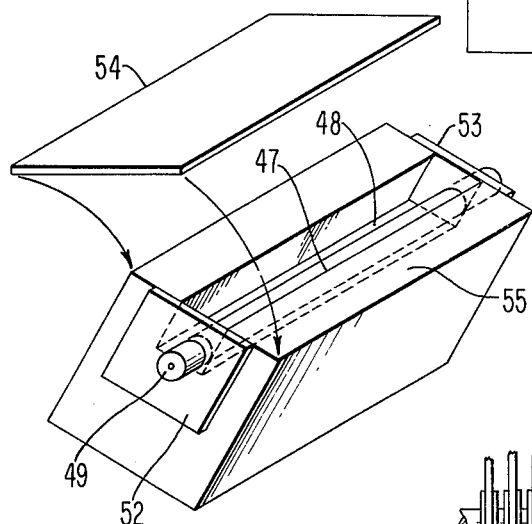
FIG. 5
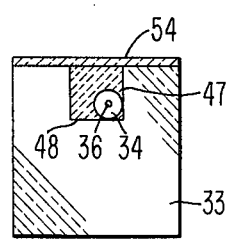
FIG. 7
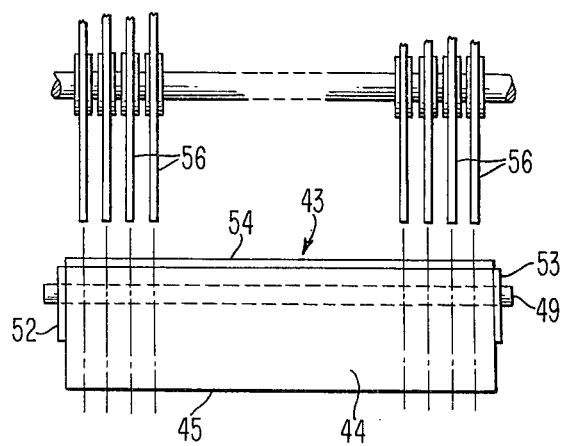
FIG. 6

PRE-AIMED NOZZLE FOR INK JET RECORDER AND METHOD OF MANUFACTURE

BACKGROUND OF THE INVENTION

1. Field of the Invention

This invention relates to nozzles, and particularly to a method of making nozzles for use in an ink jet recorder apparatus.

2. Description of the Prior Art

In ink jet recorders liquid ink is supplied under pressure to a nozzle device having a very small orifice through which a very fine, continuous jet of ink is projected. Nozzle devices are known in which an orifice element is fixedly attached to a nozzle block having fluid passageway therein connected to a source of pressurized liquid ink. It has been found that the most desirable jet stream for recording is produced when the aspect ratio of the orifice, i.e., the ratio of the diameter to the length of the orifice is very small, for example, in the order of less than 1. This means that the orifice element must be extremely small. Handling of such small orifice elements is difficult during the fabrication process. Also, attachment of extremely small orifice elements to the nozzle structure presents a problem, particularly in connection with aiming so that the direction of stream projection is precisely aligned when assembled in an ink jet recorder with the jet control elements. Very slight errors in the alignment of the orifice element relative to the nozzle structure can produce very substantial errors in the direction of the jet stream which cause fouling and contamination of the recording apparatus elements or which require complex structure to obtain precise aiming in the recorder apparatus.

SUMMARY OF THE INVENTION

It is a general object of this invention to provide an improved nozzle device for an ink jet recorder and an improved method of manufacturing such nozzle devices.

It is a specific object to provide a pre-aimed nozzle device and a method of manufacturing therefor.

It is also a specific object of this invention to provide an improved method of making nozzles for ink jet recorders in which greater precision is obtained in the aiming of the nozzle orifice.

It is a further object of this invention to provide an improved method for making an orifice element for use in a nozzle device of an ink jet recorder.

The nozzle device in accordance with this invention comprises essentially a support block and an orifice wafer. The block has a fluid passageway connectable to a source of liquid ink and which terminates in an opening in a flat surface on the block. The orifice wafer comprises an annular orifice element fixedly held within the body portion of the wafer in such a manner that the annular end surface of the orifice element and the wafer body surface form a coplanar surface and the axis of the opening in the orifice element is perpendicular to this coplanar surface. The coplanar surface of the wafer is bonded to the flat surface of the support block so that the opening of the orifice element and the fluid opening in the block are in alignment. Location indicia, preferably in the form of grooves with horizontal and vertical surfaces are formed in the block for aligning the orifice element with the fluid opening in the nozzle block. The opening in the block is larger than the orifice opening but smaller than the annular diameter of the orifice element so that a fluid-tight seal is obtained around the fluid opening in the block and entirely between the orifice element and the nozzle block. This assures that when pressurized ink is supplied to the block, leakage will not occur around the orifice element. For accurate preaiming of the nozzle device, the nozzle block is provided with an aiming surface. The coplanar surface of the wafer and the surface of the block to which the wafer is bonded are parallel with this aiming surface. In such an arrangement the nozzle device can be readily and easily aimed with high precision when mounted in the support structure of an ink jet recorder apparatus.

Further in accordance with this invention the method for making the wafer essentially comprises surrounding a straight piece of fine fiberlike tube of glass material or the like with an encapsulating mass and cutting the mass into thin sections perpendicular to the axis of the tube. In the preferred embodiment for obtaining the precision accuracy desired for a pre-aimed nozzle device the encapsulating mass takes the form of a ceramic block machined to have at least two flat orthogonal external location surfaces. A third surface of the block is machined to have a groove with two orthogonal flat internal location surfaces parallel with the two external location surfaces. A straight piece of fiberlike tube predrawn to the desired external diameter and thickness is placed in the groove with the tube periphery throughout the length of the groove in contact with both internal location surfaces. Encapsulation is completed by filling the unoccupied spaces of the groove with a solidified filler material while retaining the fiber tube in contact with the internal location surfaces. In the preferred embodiment the tube is glass and the filler material is solder glass placed into the groove on top of the tube and then heated, preferably in a vacuum to cause the solder glass, when molten, to flow into and fill all unoccupied spaces around the tube. After cooling, the block with the tube and solidified filler material is sliced into thin sections, preferably thicker than the ultimate desired length of the orifice element along planes perpendicular to the external location surfaces of the wafer block. Since the tube was precisely aligned within the groove relative to the external location surfaces, cutting perpendicular to the external location surfaces assures that the opening of the orifice element is precisely perpendicular and coplanar with the wafer surfaces. Thus, accurate aiming of the orifice element is readily achieved without times consuming efforts to align the cutting tool with the central axis of the tube.

The method of manufacturing a precision nozzle device further contemplates forming a nozzle block, preferably of ceramic with parallel front and rear flat surfaces, the rear surface forming a reference surface for aiming. the fluid passageway for connection to a source of pressurized fluid is formed in the nozzle block with an opening in the front flat surface of a size less than the outer diameter of the annular orifice element, but greater than the opening in the orifice element. The orifice wafer is attached to the front flat surface of the nozzle block with the opening of the orifice element aligned with the fluid opening of the passageway. For this purpose, a fluit-tight seal is formed around the opening in the front surface of the nozzle block by bonding the annular end surface of the orifice element and the wafer body to the front surface of said nozzle block. In the preferred embodiment of the invention the bonding is obtained by using a thin coating of solder glass applied to the front surface of the nozzle block.

The coating covers at least that portion of the front surface of the nozzle block coextensive with the dimensions of the wafer and entirely around the passageway opening. With the wafer properly aligned and with its coplanar surface in contact with the layer of solder glass the assembly is heated causing the solder glass to become molten and when cooled to bond the wafer and orifice element to the front surface of the nozzle block. The wafer is then machined to the desired thickness so as to be parallel with the rear surface on the nozzle block. This assures that the orifice element will have the desired aspect ratio and will be precision aimed relative to the aiming surface of the nozzle block.

Thus, it will be apparent that a nozzle device has been provided which is very accurate both as to dimension and its directional aiming. It will be further appreciated that a method for manufacturing nozzle elements and nozzle devices has been provided which is relatively easy to perform and which provides precise alignments aiming of the orifice elements while working with parts that are easy to handle.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 3, 4, 5 and 6 are sequence of drawings showing the method for making the orifice wafer used in the nozzle device of this invention.

FIG. 7 is a front elevation of an orifice wafer made in accordance with the method illustrated in FIGS. 3-6.

DETAILED DESCRIPTION OF THE INVENTION

Figure 1:
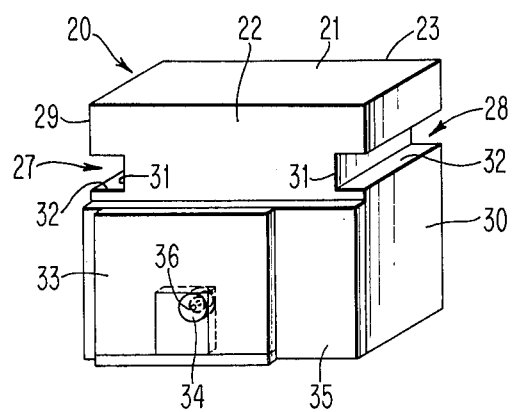
FIG. 1 is an isometric drawing showing a nozzle device made in accordance with this invention.

As seen in FIG. 1, a pre-aimed nozzle device 20 in accordance with this invention comprises a nozzle block 21 having parallel front and rear surfaces 22 and 23, respectively. A fluid passageway 24 (see FIG. 11) is formed in the lower portion of the nozzle block 21 having one end which terminates in an opening 25 in the front surface 22 and a second portion 26 which terminates at the rear surface 23. The second portion 26 of passageway 24 is preferably enlarged to receive a tube or other means for connection to a source of liquid ink under pressure. While the fluid passageway 24 is shown emanating from the rear surface of block 21, it is believed clear that the connection to the pressurized liquid ink source could be made through openings in the lateral surfaces of block 21. Location grooves 27 and 28 are formed in lateral surfaces 29 and 30, respectively, of block 21. The vertical surfaces 31 and the horizontal surfaces 32 of the location grooves 28 and 29 serve as X-Y coordinate reference points relative to the opening 25 in the front face 22.

Figure 11:
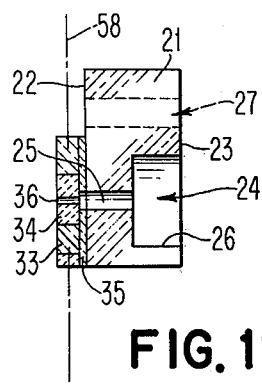

An orifice wafer 33 for use in this invention includes an orifice element 34 fixedly held by the wafer 33 and bonded with the wafer to the front surface 22 of the nozzle block 21 by a bonding layer 35. The orifice element 34 has an opening 36 aligned with opening 25 in nozzle block 21. As best seen in FIG. 11, the orifice opening 36 has a diameter substantially smaller than the opening 25 (which also extends through bonding layer 35) while the outer diameter of the orifice element 34 is substantially greater than the diameter of opening 25. As will be more readily apparent in the subsequent description, opening 36 has a central axis which is perpendicular to the rear surface 23 of nozzle block 21 which serves as the aiming surface for the nozzle device 20.

Figure 2:
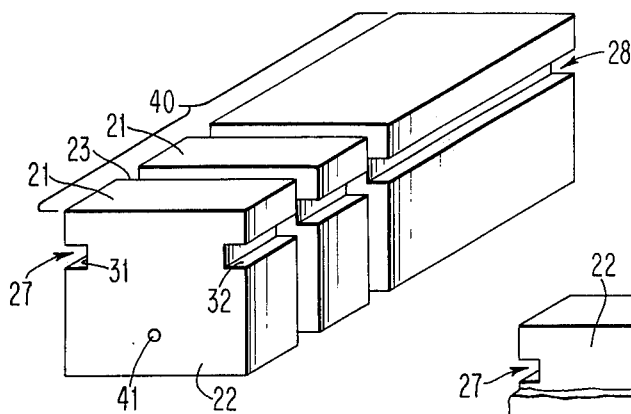
FIG. 2 is an isometric drawing showing the method for making the nozzle block portion of the nozzle device of this invention.
Figure 8:
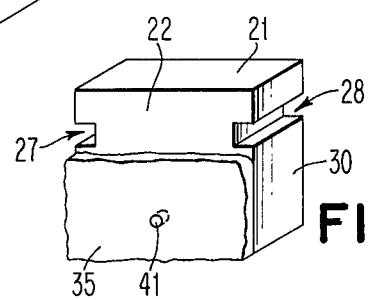
FIGS. 8, 9, 10 and 11 are a sequence of drawings showing the steps in assembling the wafer element of FIG. 7 to the nozzle block formed in accordacne with FIG. 2.

As seen in FIG. 2, a nozzle block 21 is made by cutting transverse sections from a housing block 40. Prior to cutting the sections lateral grooves 27 and 28 are ground in the side surfaces of the housing block 40. The grooves are ground to a dimension suitable for receipt of dowel pins (not shown) or the like which are designed to make coincident contact with one of the vertical surfaces 31 and the horizontal surfaces 32 of the grooves 27 and 28. Also, prior to sectioning of block 40, a hole 41 is drilled through the entire housing block 40. This hole is roughly located relative to the vertical surface 31 and horizontal surfaces 32 of the grooves 27 and 28. The housing block is cut such that the surfaces 22 and 23 are parellel to one another and perpendicular to surfaces 31 and 32. After a section has been cut, the hole 41 is enlarged in rear surface 23 to provide the enlarged section 26, as seen in FIG. 11, for fitting of a tube as previously described.

The next step for making the nozzle device 20 is to fabricate the orifice wafer. The method for making the orifice wafer 33 is as follows:

A ceramic wafer block 43 (see FIGS. 3-6), of substantially square cross-section, is machined to have precisely orthogonal side surface 44 and bottom surface 45. A location groove 46, preferably of square cross-section is ground in the top of block 43. The grinding of the groove 46 is done so that the interior surface 47 is parallel with external surface 44 and bottom surface 48 is parallel with the external bottom surface 45. The next step in the process is to place a straight piece of fiber-like glass tube 49 into groove 46 with the periphery of the tube in contact with the interior location surfaces 47 and 48. The orifice tube 49 is preferably longer than the wafer block 43 so that its opposite ends extend beyond the end surfaces 50 and 51 of the wafer block 43. The orifice tube 49 will have been predrawn to an outside diameter substantially uniform throughout its length, which is greater than the diameter of opening 25 in the front surface 22 of nozzle block 21 as previously described. Also, the opening 36 in the tube 49 will have been fabricated to the desired size somewhat less than the diameter of the opening 25 in front surface 22 of nozzle block 21. Various means for drawing glass tubing can be used and are well-known in the prior art and do not form a part of this invention. Having placed the tube 49 in groove 46, it is fitted with end plates 52 and 53 which loosely fit on the ends of the tube extending beyond the front and rear surfaces 51 and 50 of the wafer block 43. The weight of the end pieces 52 and 53 and the tube hold the tube 49 in contact with the interior location surfaces 47 and 48. The block 43 is slightly canted (see FIG. 5) from the vertical to assure that the tube 49 is maintained in contact with the internal surfaces 47 and 48 of groove 46. Other ways for maintaining the tube 49 in contact with the interior location location surfaces 47 and 48 would be to cut groove 46 to substantially the same size as the diameter of the tube 49 or by wedging using ceramic inserts in groove 46 at one or more points along the tube 49. These alternate approaches might be used where a tube is not straight. The groove 46 is then filled with a quantity of solder glass either in form of a powder or shredded fiber so that it substantially fills the space around the outside of the tube. A ceramic coverplate 54 is placed over the top surface 55 of the wafer block so as to completely enclose a groove 46 filled with the ground up solder glass. The assembly is then placed in a chamber which is evacuated, the assembly being held with wafer block 43 in slightly canted position, as seen in FIG. 5. The assembly is then heated to a temperature which causes only the solder glass to melt, e.g., 460° C, to complete the encapsulation of the tube 49 within the wafer block 43. Heating is done for a period of time to enable the molten solder glass to fill the space not occupied by tube 49, e.g., 30 minutes, while the tube is maintained in contact throughout its length with the interior location surfaces 47 and 48.

Following heating, the entire assembly is allowed to cool thereby causing the solder glass to solidify and to fixedly bond the glass tube 49 to the wafer block 43. While the width of the groove 46 relative to the diameter of orifice tube 49 can vary, the preferred width is such that capillary action occurs when the solder glass is melted thereby providing a much more complete bond in the region between the ends of the groove. After cooling to room temperature, the wafer block orifice tube assembly is ready for slicing into wafers 33, as shown in FIG. 6. Slicing is preferably done using a plurality of uniformly-spaced saw elements 56 which are movable relative to the assembly. In order to obtain precise aiming of the orifice element 34 of FIG. 1, the saws are caused to cut along planes perpendicular to the external surfaces 44 and 45 of wafer block 43. While the setting up and cutting may be done in various ways well-known in the art, the preferred way is to mount the assembly of the wafer block 43 onto a workpiece fixture of a gang-sawing machine. The assembly can be adjusted so that the surfaces 44 and 45 are precisely perpendicular with the plane of the saws. After set-up, this block is then fed parallel with the plane of the saws while cutting takes place. While rotary saws are shown, reciprocating blade saws could also be used. Wafers can also be cut singly in accordance with this invention; however, simultaneous cutting of the wafers with a gang-saw arrangement, as shown in FIG. 6 is preferred since it produces more uniform thickness throughout the length of the wafer. If cutting is done with a single saw, the wafers may tend to be cut in a manner which is not uniformly thick throughout the cut thereby requiring additional finishing operations to assure uniform thickness of the individual wafers.

Also, the end wafers cut from the block can be discarded since the ends of the tube 49 extend beyond the wafer body of these end wafers. Also, depending on the relative dimensions of the groove 46 and tube 49 as previously mentioned, the solder glass filler may not completely fill the space unoccupied by the tube in the regions near the ends of the wafer block and provide an adequately tight bond in the regions.

As previously mentioned, the wafers are cut to a dimension thicker than the final desired length of the opening 36 of the orifice element 34. For greatest precision the surface of the wafers 33 on the side which is to be bonded to the front surface 22 of nozzle block 21 are lapped and polished.

Figure 10:
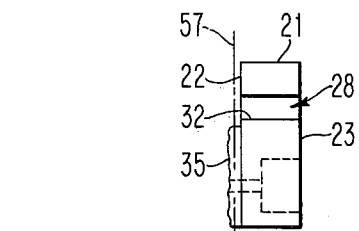
Figure 9:
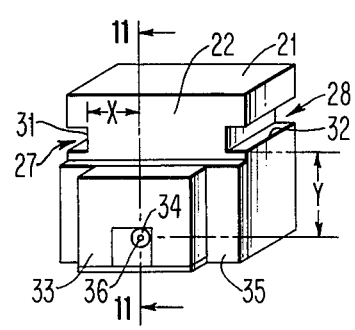

As seen in FIGS. 8 through 11, the mounting of the wafer onto block 21 is as follows:

A thin layer of bonding material of uniform thickness is applied to the front surface 22 of nozzle block 21. The bonding material is preferably solder glass. The solder glass may be painted on with a brush or the like. In that case, painting is done over only the lower portion of front surface 22 somewhat below the edge of the alignment surfaces 32 of grooves 27 and 28. The solder glass layer 35 may be deposited by deposition of solder glass particles from a colloidial suspension subjected to a centrifuge operation. In that case, the entire surface 22 may be coated or the upper portion may be masked and then removed to leave the adhesive coating on the bottom layer only. With the centrifuge method of depositing the solder glass layer onto surface 22 a very thin uniform layer is achieved directly. However, should the solder glass layer be applied by painting, then the layer is ground to the desired thickness, as shown in FIG. 10, by line 57 so that the layer is uniform and substantially parallel with rear surface 23 of nozzle block 21. Following the grinding of the bonding layer 35 the orifice wafer 33 is placed in position on the bonding layer 35 with the opening 36 of orifice element 34 aligned with opening 25. The alignment is precisely done with reference to the vertical surface 31 of groove 27 and the horizontal surfaces 32 of grooves 27 and 28. These surfaces precisely locate the center opening 36 within the opening 25. The wafer 33 is then lightly clamped to block 21. The assembly is heated to a temperature which causes the bonding layer 35 of solder glass to melt. The clamping of the wafer 33 to block 21 is maintained relatively light in order that a solder glass, when melted, will not be extruded into the opening 36 of the orifice element 34. After a reasonable heating time, e.g., 30 minutes, the assembly is allowed to cool. The solder glass of layer 35 will firmly bond the wafer 33 to the front surface 22 of the nozzle block 21. This bonding will provide a fluid-tight seal around opening 25 and between the orifice element 33 and block 21. Following cooling, the orifice wafer 33 is lapped and polished to the desired thickness such that the desired aspect ratio of the opening 32 is obtained. Grinding of the outer surface of the orifice 33 is done along a line 58 parallel to the rear surface 23 of nozzle block 21. This assures that the opening 36 of orifice element 34 is precisely aimed relative to the rear surface 23 of nozzle block 21. Thus, when the completed nozzle device assembly is mounted into an ink jet recorder apparatus, the orifice element 34 is precisely aimed by the positioning of the nozzle block 21 with reference to rear surface 23 and X-Y locations formed by surfaces 31 and 32.

Thus, it will be seen that an improved nozzle device has been provided in which precision is obtained in the dimensions and direction of the orifice. Also, the method of manufacture is relatively simple. By forming the orifice element as an integral part of a larger wafer element the handling of the orifice element and its location vis-a-vis the opening 25 in the orifice block 21 is easily managed. Also by the use of location grooves the orifice opening 36 can be very precisely located in relatively easy fashion.

While various materials can be used to fabricate a nozzle device in accordance with this invention, the preferred materials for practicing this invention comprises a machinable ceramic for forming of the nozzle block 23, the wafer body 33 and the cover plate 54. The orifice element 34 is formed from glass tubing and the filler and bonding material is solder glass, as previously mentioned. The selection of these specific materials being such that their coefficients of expansion being relatively closely matched.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A nozzle apparatus comprising:
    a support block having an ink passageway therein connectable to a source of liquid ink under pressure,
    said passageway terminating at one end in an opening in a first flat surface of said support block, and
    an orifice wafer mounted on said first flat surface of said support block comprising
    a wafer body having front and rear surfaces,
    an annular orifice element circumferentially fixed held by said wafer body and having an opening the central axis of which is perpendicular with said front and rear flat surfaces of said wafer body,
    said orifice element having an inner annular diameter less and an outer annular diameter greater than the diameter of said ink passageway of said support block,
    said orifice element having annular end surfaces on front and rear surfaces thereof which are coplanar with said front and rear flat surfaces, respectively, of said wafer body,
    said coplanar rear surfaces of said orifice element and said wafer body being attached to said support block with a fluid tight seal between said first flat surface of said support block and said coplanar rear surfaces, with the opening in said orifice element aligned with said opening in said support block.

2. A nozzle apparatus in accordance with claim 1 in which
    said support block is ceramic and said annular orifice element is glass and
    said fluid tight seal is a solder glass layer bonding the rear annular surface of said orifice element to said first flat surface of said support block in the region around said opening in said support block.

3. A nozzle apparatus in accordance with claim 2 in which said solder glass layer is of uniform thickness.

4. A nozzle apparatus in accordance with claim 1 in which
    said support block has a second flat surface for aiming said nozzle apparatus,
    said first flat surface being parallel with said second flat surface, and
    said orifice element and said wafer body being bonded to said first flat surface of said support block with the central axis of the opening of said orifice element perpendicular to said second flat surface of said support block.

5. A nozzle apparatus in accordance with claim 4 in which
    said support block is provided with location indicia for aligning the opening of said orifice element with the opening in the surface of said support block.

6. A nozzle apparatus in accordance with claim 5 in which said location indicia comprises
    groove means having vertical and horizontal surfaces for providing orthogonal coordinate locations relative to said opening in said support block.

7. A method of manufacturing a precision nozzle device comprising:
    forming a flat orifice wafer comprising an annular orifice element circumferentially retained by the body of said wafer;
    said orifice element having an opening the central axis of which is perpendicular with, and annular end surfaces on front and rear faces thereof which are coplanar with, front and rear surfaces, respectively, of said wafer body;
    forming a nozzle block with parallel front and rear flat surfaces;
    forming a fluid passageway in said nozzle block for connection to a source of pressurized fluid;
    said passageway having an opening in said front flat surface with a diameter less than the outer diameter of the annular end surfaces of said orifice element but greater than the opening in said orifice element;
    attaching the rear surface of said orifice wafer to said front surface of said nozzle block with the opening in said orifice element in line with said opening of said fluid passageway; and
    forming a fluid tight seal around said opening in said front surface of said nozzle block and said rear face of said orifice element by bonding said annular end surface of said rear face of said orifice element and said coplanar rear surface fo said wafer body to said front surface of said nozzle block.

8. A method of manufacturing in accordance with claim 7 in which
    said orifice wafer is formed with an initial thickness greater than the desired length said opening in said orifice element, and
    machining the front surface of said wafer after attachment to said nozzle block to a thickness equal to the desired length of said opening in said orifice element.

9. A method of manufacturing in accordance with claim 8 in which
    said front surface of said wafer is machined parallel with said rear flat surface of said nozzle block.

10. A method of manufacturing a precision nozzle device in accordance with claim 9 in which
    said orifice wafer and said nozzle block are formed from machinable ceramic,
    said annular orifice element is formed from glass, and
    said bonding of the rear coplanar surfaces of said orifice element and said wafer body to said front surface of said nozzle block is obtained by applying a uniformly thick coating of solder glass to said front surface of said nozzle block,
    bringing said annular end surface of the rear face of said orifice element and said rear flat surface of said wafer body into contact with said layer of solder glass, and
    heating said nozzle block and said orifice wafer to cause said solder glass to form a fluid tight seal between the rear coplanar surfaces of said annular orifice element and said wafer body with said front surface of said orifice block.

11. A method of manufacturing a precision nozzle device comprising:
    forming a wafer block having first and second orthogonal flat external location surfaces,
    forming a location groove in said wafer block, said location groove being coextensive with and having first and second orthogonal internal location surfaces precisely parallel with said first and second external location surfaces of said wafer block, fixing a fine elongate hollow tube member in said location groove with the periphery of said tube member in contact substantially throughout its length only with said first and second flat orthogonal internal location surfaces of said groove with a solidified filler material completely filling the space in said groove not occupied by said tube member, forming orifice wafers from said wafer block said tube member and said solidified filler material by cutting along parallel lines perpendicular with said first and second external location surface of said wafer block.

12. A method of manufacturing a precision nozzle device in accordance with claim 11 is which
said orifice wafers are formed by cutting simultaneously along said parallel lines perpendicular with said first and second external location surfaces of said wafer block.

13. A method of manufacturing a precision nozzle device in accordance with claim 4 in which said wafer block is machinable ceramic, said tube member is glass, and said filler material is solder glass.

14. A method of manufacturing a precision nozzle device in accordance with claim 13 in which,
said fixing of said hollow elongate tube member in said location grooves is performed by placing solid particles of solder glass in said grooves in the space above said tube member while retaining said tube member in contact with said internal location surfaces of said grooves, said quantity of said solid solder glass being sufficient when heated to fill the space in said grooves not occupied by said tube member, then heating said wafer block, said tube member and said solid filler material to cause said solder glass to become molten and completely fill said unoccupied spaces of said groove while retaining said tube member in contact with said internal location surfaces of said groove, and cooling said wafer block and tube member and molten solder glass to cause said solder glass to solidify and bond said tube member within said groove with said tube member in contact with said location surfaces of said groove in said wafer block.

* * * * *